(12) United States Patent
Szymanski et al.

(10) Patent No.: US 7,399,355 B2
(45) Date of Patent: Jul. 15, 2008

(54) FLUID LOSS CONTROL ADDITIVE AND CEMENT COMPOSITIONS COMPRISING SAME

(75) Inventors: Michael J. Szymanski, Duncan, OK (US); Samuel J. Lewis, Duncan, OK (US); Christian Spindler, Burghausen (DE); Andrea Fenchl, Wasserburg (DE)

(73) Assignees: Halliburton Energy Services, Inc., Duncan, OK (US); BASF Contruction Polymers GmbH, Trostberg (DE)

( * ) Notice: Subject to any disclaimer, the term of this patent is extended or adjusted under 35 U.S.C. 154(b) by 620 days.

(21) Appl. No.: 11/063,006

(22) Filed: Feb. 22, 2005

(65) Prior Publication Data

US 2006/0189487 A1 Aug. 24, 2006

(51) Int. Cl.
*C04B 24/00* (2006.01)

(52) U.S. Cl. ........................ 106/696; 106/724; 106/729; 106/730; 106/823; 405/267; 524/2; 524/4

(58) Field of Classification Search ................. 106/696, 106/724, 729, 730, 823; 405/267; 524/2, 524/4
See application file for complete search history.

(56) References Cited

U.S. PATENT DOCUMENTS

| | | | |
|---|---|---|---|
| 2,576,955 A | 12/1951 | Ludwig | 260/29.6 |
| 4,234,344 A | 11/1980 | Tinsley et al. | 106/88 |
| 4,304,298 A | 12/1981 | Sutton et al. | 166/293 |
| 4,340,427 A | 7/1982 | Sutton | 106/87 |
| 4,367,093 A | 1/1983 | Burkhalter et al. | 106/87 |
| 4,450,010 A | 5/1984 | Burkhalter et al. | 106/87 |
| 4,515,635 A | 5/1985 | Rao et al. | 106/90 |
| 4,524,828 A | 6/1985 | Sabins et al. | |
| 4,555,269 A | 11/1985 | Rao et al. | 106/90 |
| 4,557,763 A | 12/1985 | George et al. | 106/90 |
| 4,565,578 A | 1/1986 | Sutton et al. | 106/87 |
| 4,676,317 A | 6/1987 | Fry et al. | 166/293 |
| 4,687,516 A | 8/1987 | Burkhalter et al. | 106/90 |
| 4,703,801 A | 11/1987 | Fry et al. | 166/293 |
| 4,806,164 A | 2/1989 | Brothers et al. | 106/90 |
| 5,009,269 A | 4/1991 | Moran et al. | 166/293 |
| 5,121,795 A | 6/1992 | Ewert et al. | 166/292 |
| 5,238,064 A | 8/1993 | Dahl et al. | 166/293 |
| 5,348,584 A | 9/1994 | Brothers et al. | 106/725 |
| 5,488,994 A | 2/1996 | Laurel et al. | 166/387 |
| 6,180,689 B1 | 1/2001 | Moulin | 523/130 |
| 6,342,467 B1 | 1/2002 | Chang et al. | 507/110 |
| 6,457,524 B1 | 10/2002 | Roddy et al. | 166/293 |
| 6,605,570 B2 | 8/2003 | Miller et al. | 507/211 |
| 6,730,722 B1 | 5/2004 | Eck et al. | |
| 6,739,806 B1 | 5/2004 | Szymanski et al. | 405/267 |
| 6,767,867 B2 | 7/2004 | Chatterji et al. | 507/216 |
| 6,770,604 B2 | 8/2004 | Reddy et al. | 507/224 |
| 6,840,319 B1 | 1/2005 | Chatterji et al. | 166/293 |
| 2003/0008779 A1 | 1/2003 | Chen et al. | 507/200 |
| 2004/0262000 A1 | 12/2004 | Morgan et al. | 166/293 |

OTHER PUBLICATIONS

Halliburton brochure entitled "Diesel-Oil Cement Water-Control System" dated 1999.
Halliburton brochure entitled "DOC-3 Surfactant" dated 1999.
Halliburton brochure entitled "DOC-10 Surfactant" dated 1999.
Halliburton brochure entitled "MicroBond Expanding Additive for Cement" dated 1999.
Halliburton brochure entitled "MicroBond HT Cement Additive" Dated 1999.
Halliburton brochure entitled "MicroBond M Cement Additive" dated 1999.
Halliburton brochure entitled "HydroChek Service—MOC/One Slurry for Selective Water Control" undated but admitted to be prior art.
Halliburton brochure entitled "Spherelite Cement Additive" dated 1999.
Halliburton brochure entitled "Super CBL Additive Cement Additive" Dated 1999.
Foreign communication from a related counterpart application dated Jul. 6, 2006.

*Primary Examiner*—Paul Marcantoni
(74) *Attorney, Agent, or Firm*—Craig W. Roddy; Conley Rose, P.C.

(57) ABSTRACT

A fluid loss control additive comprising a crosslinked polymer and sugar and cement compositions comprising the same. In one embodiment, the fluid loss control additive comprises a polymer and a sugar connected by a pH-sensitive crosslink. In some embodiments, the polymer is a polyvinyl alcohol, and the sugar is a sugar alcohol such as sorbitol.

19 Claims, No Drawings

FLUID LOSS CONTROL ADDITIVE AND CEMENT COMPOSITIONS COMPRISING SAME

CROSS REFERENCE TO RELATED APPLICATIONS

Related co-pending application concurrently filed is U.S. patent application Ser. No. 11,062,977 entitled "Methods of Cementing Using A Fluid Loss Control Additive," which is incorporated by reference herein in its entirety.

BACKGROUND OF THE INVENTION

1. Field of the Invention

This invention relates to the field of cement compositions and more specifically to the field of cement compositions comprising fluid loss control additives.

2. Background of the Invention

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Secondary cementing operations may also be performed after the primary cementing operation. One example of a secondary cementing operation is squeeze cementing whereby a cement slurry is forced under pressure to areas of lost integrity in the annulus to seal off those areas.

The cement compositions typically include a fluid loss control additive to reduce the loss of fluid, e.g., water, from the cement compositions when in contact with permeable subterranean formations and zones. Fluid loss from the cement composition may cause problems such as premature dehydration. Premature dehydration of the cement may lead to problems such as limits on the amount of cement composition that can be pumped; a decrease in the compressive strength of the cement composition; and a negative impact bond strength between the set cement composition and a subterranean zone, the walls of pipe and/or the walls of the wellbore.

Large, water-soluble polymers such as copolymers of acrylamide and 2-acrylamido, 2-methyl propane sulfonic acid have typically been used as synthetic fluid loss control additives. However, such fluid loss control additives may lead to problems such as being useful in a limited number of operations. For instance, the copolymers may not be efficient at higher wellbore circulating temperatures. Moreover, the copolymers may affect the rheology of the cement composition as they may exhibit high viscosity and poor mixability, which may lead to the need of a sufficiently large amount of fluid loss control additive to create a cement composition having an acceptable fluid loss. Such a sufficiently large amount of fluid loss control additive may lead to viscosity and pumpability problems. In addition, some copolymers may not have a salt tolerance suitable for applications involving cement compositions comprising salts. Further drawbacks include that synthetic polymers may not comply with environmental regulations in certain regions of the world. For example, the use of polyamide polymers in the North Sea may be problematic because of the high molecular weight and poor biodegradability of such synthetic polymers.

Consequently, there is a need for a fluid loss control additive that that is suitable for use in a wider range of wellbore circulating conditions. In addition, needs include a fluid loss control additive that is more compliant with environmental regulations. Additional needs include a biodegradable fluid loss control additive. Further needs include a more efficient cement composition comprising a fluid loss control additive.

BRIEF SUMMARY OF SOME OF THE PREFERRED EMBODIMENTS

These and other needs in the art are addressed in one embodiment by a cement composition comprising cement, water, and a fluid loss control additive comprising a polymer and a sugar connected by a pH-sensitive crosslink. The polymer may be a polyvinyl alcohol (PVA), and the sugar may be sorbitol.

In another embodiment, needs are addressed by a fluid loss control additive comprising a polymer and a sugar connected by a pH-sensitive crosslink. The fluid loss control additive may be in the form of an emulsion. In some embodiments, the emulsion contains a hydrophobic carrier fluid such as a vegetable oil.

The cement composition comprising a polymer such as polyvinyl alcohol and sugars such as sorbitol overcomes problems in the art such as inefficiency as a fluid loss control additive at higher wellbore circulating temperatures. For instance, at higher temperatures, the cement composition does not require sufficiently large amounts of the PVA and sorbitol. In addition, the PVA and sorbitol may be more efficient with cement compositions comprising salts.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

In an embodiment, a cement composition includes a cement, water, and a fluid loss control additive comprising a complex of a crosslinked polymer and a sugar. The polymer and the sugar are connected by a pH-sensitive crosslink and may provide a fluid loss control additive that is biodegradable. In some embodiments, the fluid loss control additive is an emulsion also including a hydrophobic carrier fluid. In other embodiments, the fluid loss control additive comprises a polyvinyl alcohol complex.

The cement compositions are suitable for subterranean applications such as well completion and remedial operations. It is to be understood that "subterranean applications" encompass both areas below exposed earth and areas below earth covered by water such as ocean or fresh water. In some embodiments, the cement compositions include a sufficient amount of water to form a pumpable slurry. The cement compositions may comprise a density of from about 4 lb/gallon to about 23 lb/gallon. In alternative embodiments, the cement compositions may comprise a density of from about 12 lb/gallon to about 17 lb/gallon. In other alternative embodiments, the cement compositions may be low-density cement compositions with a density of from about 5 lb/gallon to about 12 lb/gallon.

The cement composition comprises a cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

A sufficient amount of water is added to the cement to form a pumpable cementitious slurry. The water may be fresh water or salt water, e.g., an unsaturated aqueous salt solution or a saturated aqueous salt solution such as brine or seawater, or a non-aqueous fluid. The water may be present in the amount of from about 16 to about 180 percent by weight of cement, alternatively from about 28 to about 60 percent by weight of cement.

The cement compositions comprise a sufficient amount of the fluid loss control additive to provide a desired level of fluid loss control in a cement composition. In an embodiment, the fluid loss control additive may be present in the cement compositions in an amount from about 0.01 to about 10.0 percent by weight of the cement. In another embodiment, the fluid loss control additive may be present in the cement composition in an amount from about 0.2 to about 1.4 percent by weight of the cement. Fluid loss control additives comprising pH-sensitive crosslinked polymers are disclosed in U.S. Pat. No. 6,739,806, which is incorporated herein by reference in its entirety. In an embodiment, the fluid loss control additive does not increase viscosity of the cement composition.

The fluid loss control additive comprises a complex of a polymer and a sugar connected by a pH-sensitive crosslink (e.g., a borate ester of polyvinyl alcohol). In an embodiment, the fluid loss control additive comprises a weight ratio of polymer to sugar of from about 1:3 to about 10:1, alternatively from about 1:2 to about 5:1. The pH-sensitive crosslink between the polymer and the sugar is achieved through the use of a polyvalent cation which may be referred to as a crosslinker. Any polyvalent cation capable of connecting two or more polymer strands through a pH-sensitive crosslink may be suitable for use with the fluid loss control additives. It is to be understood that one of ordinary skill in the art with the benefit of this disclosure would be able to recognize the appropriate polyvalent cation for use in a particular application. In some embodiments, the polyvalent cation comprises a Group IIIA element such as boron or aluminum or a Group IVB element such as titanium or zirconium. In some embodiments, the boron may be provided by a borate ion. Examples of suitable sources of borate ions include without limitation borax, sodium borate, boric acid and combinations thereof. An example of a suitable source of borate ion is reagent grade boric acid, which is commercially available from Sigma Aldrich, Inc. In an embodiment, the fluid loss control additive contains the polyvalent cation in the amount of from about 0.001 to about 5 percent by weight of the polymer, alternatively from about 0.05 to about 0.2 percent by weight of the polymer.

The pH-sensitive nature of the crosslink between the polymer and the sugar may improve the degradability of the fluid loss control additives of the present invention. Without being limited by theory, the pH-sensitive nature of the crosslink may cause the crosslinked polymer and sugar to fall apart in a solution of water having a pH within a particular range, depending on the polyvalent cation used to make the crosslink. In some embodiments wherein the polyvalent cation comprises boron, the crosslinked polymer and sugar may fall apart in a solution of water having a pH below about 9.2. It is to be understood that the typical cement composition has a pH ranging from about 10 to about 13. Therefore, the fluid loss control additive may be substantially stable when placed in such a typical cement composition. However, in embodiments wherein such a pH-sensitive crosslink is placed into a source of free water (e.g., seawater), the crosslink between the polymer and the sugar may be broken, thus releasing into the seawater a lower molecular weight polymer that may be more likely to biodegrade.

A sugar refers to a water-soluble crystalline carbohydrate. Examples of suitable sugars include without limitation monosaccharides, disaccharides, and trisaccharides. In some embodiments, the sugar provides the base monomer for PVA. In one embodiment, the sugar is a sugar alcohol. Sugar alcohols refer to polyols having more than three hydroxyl groups. Such sugar alcohols are represented by the following general formula:

$$CH_2OH(CHOH)_nCH_2OH,$$

where n may be from 2 to 5. Without limitation, examples of sugar alcohols include sorbitol, maltitol, isomalt, xylitol, lactitol, hydrogenated starch hydrolysates, and combinations thereof. In some embodiments, the sugar alcohol is sorbitol. Sorbitol is a white, sweetish crystalline alcohol that is found naturally in fruits and vegetables. It is represented by the chemical formula $C_6H_8(OH)_6$, which may be represented by the following structure.

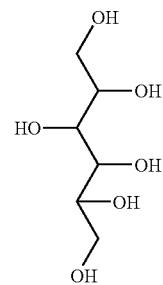

In some embodiments, the polymers may comprise polyalcohols; alpha hydroxy acids; 1,2 amines; and combinations thereof. Examples of suitable polyalcohols include without limitation 1,2 alcohols and 1,3 alcohols. Without limitation, an example of a suitable 1,2 alcohol is polysaccharide (e.g., guar gum), and an example of a suitable 1,3 alcohol is a polyvinyl alcohol. Examples of commercially available polyvinyl alcohols include ERKOL 40/140, which is available from Cross World Sale Corporation.

In some embodiments, the fluid loss control additive comprises an emulsion, which includes the polymer, the sugar, and a carrier fluid. In some embodiments, the carrier fluid may be a hydrophobic carrier fluid such as a vegetable oil. Without limitation, examples of suitable vegetable oils include soybean oil, corn oil, grape seed, coconut oil, rape oil, and combinations thereof. The fluid loss control additive may contain an amount of the carrier fluid suitable for forming the emulsion. In an embodiment, the fluid loss control additive may comprise from about 1 to about 90 wt. % carrier fluid, from about 50 to about 90 wt. % carrier fluid, alternatively from about 60 to about 70 wt. % carrier fluid.

The fluid loss control additive may also contain a sufficient amount of water to form a pumpable emulsion. The water may be fresh water or salt water, e.g., an unsaturated aqueous salt solution or a saturated aqueous salt solution such as brine or seawater, or a non-aqueous fluid. The fluid loss control additive may comprise from about 5 to about 25 wt. % water, alternatively from about 10 to about 20 wt. % water. In an embodiment, the cement composition may contain the emulsion in an amount from about 0.02 to about 5 percent by weight of the cement, alternatively from about 0.2 to about 3 percent by weight of the cement, and alternatively from about 0.5 to about 1.5 percent by weight of the cement.

In other embodiments, the emulsion may also contain an emulsifier such as a surfactant. Without limitation, examples of suitable surfactants include ethoxylated glyceryl fatty acid esters such as without limitation PEG 20 glyceryl laurate, PEG 20 glyceryl oleate, PEG 20 glyceryl oleoricinoleate, and PEG 20 glyceryl stearate; sorbitan esters and ethoxylated sorbitan esters such as without limitation sorbitan monolaurate, sorbitan trioleate, PEG 20 sorbitan monolaurate, PEG 20 sorbitan trioleate, and PEG 4 sorbitan monolaurate; and imidazole fatty acid condensates. Such suitable cement surfactants are available from Halliburton Energy Services, Inc. as MOC-ONE and DOC-3. The emulsion may include from about 0.1 to about 10.0 wt. % emulsifier, alternatively from about 0.5 to about 10.0 wt. % emulsifier.

The fluid loss control additive can be prepared in a variety of ways. In an embodiment, the fluid loss control additive is made by mixing the polymer and the sugar in a solvent to form a mixture, adding a polyvalent cation to the mixture, and adjusting the pH as necessary to crosslink the polymer and sugar until the resulting solution achieves a desired molecular weight. In an embodiment, the mixture of the solvent, polymer, and sugar may comprise from about 5 to about 50 wt. % of polymer and sugar combined. Adjusting the pH includes adding an aqueous solution of a base to the solution to adjust the pH to a desired value. The polymer/sugar complex solution is then dried to isolate the complex as a powder. To form an emulsion containing the complex, the hydrophobic carrier fluid is mixed with water and then emulsified with a surfactant. The powder complex is added to the emulsion while stirring and afterwards mixed.

In another embodiment, the fluid loss control additive is formed in a suspension of the polymer and the sugar in an inert solvent. A desired amount of polyvalent cation and a base are added as aqueous solution to adjust the pH. After the complex formation of the fluid loss control additive is complete, the solvent is removed by distillation to provide the complex in powder form, which is then dried (e.g., in a vacuum oven). To form an emulsion containing the dried complex, the hydrophobic carrier fluid is mixed with water and then emulsified with a surfactant. The powder complex is added to the emulsion while stirring and afterwards mixed.

In still another embodiment, the fluid loss control additive complex is directly formed in the hydrophobic carrier fluid. The hydrophobic carrier fluid is mixed with water then emulsified with a surfactant. The polymer and the sugar are added and crosslinked with a polyvalent cation and a base, which adjusts the pH. The emulsion is then mixed.

Examples of suitable solvents include without limitation water and 2-propanol. Without limitation, an example of a suitable base includes sodium hydroxide. In an embodiment, the pH can be adjusted until the solution has a molecular weight from about 5,000 to about 500,000, alternatively from about 50,000 to about 250,000. It is to be understood that one of ordinary skill in the art with the benefit of this disclosure will be able to identify suitable methods of measuring molecular weight of the solution and also will be able to recognize when a sufficient degree of crosslinking has been achieved. One such suitable method of detection is multi-angle light scattering HPLC. It is to be understood that any suitable method of mixing the solution with the carrier fluid, water, and emulsifier may be used.

The fluid loss control additives may be added to the cement compositions in a variety of ways. For instance, the dry cement, water and fluid loss control additive may be mixed in any order and given sufficient time to let the fluid loss control additive hydrate. In some instances, the dry materials may swell when contacted with water. In such instances, an appropriate waiting period for hydration may be about 10 minutes after the end of visible swelling. In other instances, the fluid loss control additives may be added according to standard American Petroleum Institute (API) procedures.

In some embodiments, the cement composition is a low-density cement composition such as a foamed cement composition or one that includes density reducing additives. For a foamed cement composition, an embodiment may include the foamed cement composition comprising foaming agents, foam stabilizing agents, and combinations thereof, which may be included in the cement composition to facilitate the foaming and/or enhance the stability of the cement composition. Such foaming and/or foam stabilizing agents may be present in the cement composition in an amount sufficient to provide a stable, foamed cement composition. It is to be understood that one of ordinary skill in the art would be able to select the proper foaming and/or foam stabilizing agents as well as the amounts of such agents according to the particular application.

In an embodiment, the foamed cement composition may include an expanding additive. The expanding additive may be any component that enables a gas to become incorporated into the cement composition. Without limitation, examples of suitable expanding additives in particulate form include aluminum powder, gypsum blends, deadburned magnesium oxide, and combinations thereof. Examples of expanding additives comprising aluminum powder that are commercially available include "GAS-CHEK" and "SUPER CBL" from Halliburton Energy Services, Inc. An example of an expanding additive comprising a blend containing gypsum is commercially available as "MICROBOND" from Halliburton Energy Services, Inc. In addition, examples of expanding additives comprising deadburned magnesium oxide are commercially available as "MICROBOND M" and "MICROBOND HT" from Halliburton Energy Services, Inc. Such expanding additives are described in U.S. Pat. Nos. 4,304,298; 4,340,427; 4,367,093; 4,450,010 and 4,565,578, which are incorporated herein by reference in their entirety. The cement composition may contain an amount of the expanding additive from about 2 to about 18 wt. %, alternatively from about 5 to about 10 wt. %.

The addition of an expanding additive to the cement composition may be accomplished by any suitable method. In one embodiment, the cement composition is foamed by direct injection of an expanding additive into the cement composition. For instance, where the cement composition is foamed by the direct injection of gas into the cement composition, the gas utilized may be air, an inert gas such as nitrogen, and combinations thereof. In other embodiments, the cement composition is foamed by gas generated from a reaction between the cement composition and an expanding additive present in the cement composition in particulate form. For example, the cement composition may be foamed by hydrogen gas generated in situ as the product of a reaction between the high pH slurry and fine aluminum powder present in the cement.

In an embodiment, a low-density cement composition includes density reducing additives. Without limitation, examples of density reducing additives include hollow glass beads, microspheres, and combinations thereof. The density reducing additives may include any microspheres that are compatible with a subterranean cement composition (i.e., that are chemically stable at least until the cement sets). An example of a suitable microsphere is commercially available from Halliburton Energy Services, Inc. as "SPHERELITE." The low-density cement composition may include the microspheres in an amount sufficient to provide a cement composition having a density in a desired range. In an embodiment, the microspheres may be present in the cement composition in an amount from about 10 to about 150 percent by weight of the cement. The microspheres may be added to the cement composition by any suitable method including dry blending with the cement before the addition of a fluid such as water, mixing with the fluid to be added to the cement, or by mixing with the cement slurry consecutively with or after the addition of the fluid. In another embodiment, the microspheres may be pre-suspended in water and injected into the cement mix fluid or into the cement slurry as an aqueous slurry.

In some embodiments, additional additives may be added to the cement composition for improving or changing the properties thereof. Examples of such additives include but are not limited to accelerants, set retarders, defoamers, weighting materials, dispersants, vitrified shale, fly ash, formation conditioning agents, and combinations thereof.

The foregoing cement compositions may be used in various cementing operations wherein the cement is displaced into a workspace and allowed to set. In an embodiment, the cement compositions are used in various surface applications to cement a workspace at or above the ground, for example, a workspace encountered in the construction industry. In another embodiment, the cement is used in a subterranean workspace, for example in cementing underground pipe such as sewer pipe or wellbore casing. In one embodiment, the cement compositions may be employed in primary cementing a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be displaced down through the conduit and up through the annulus one or more times, for example, twice, to clean out the hole. The cement composition may then be conveyed downhole and up through the annulus, thereby displacing the drilling fluid from the wellbore. The cement composition sets into a hard mass, which forms a cement column that isolates an adjacent portion of the subterranean formation and provides support to the adjacent conduit.

In another embodiment, the cement composition may be employed in a secondary cementing operation such as squeeze cementing, which is performed after the primary cementing operation. In squeeze cementing, the cement composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The cement composition sets within the permeable zones, thereby forming a hard mass to plug those zones and prevent fluid from leaking therethrough.

It is to be understood that the cement compositions can be made by combining all of the components in any order and mixing the components in any sufficient manner known to one of ordinary skill in the art.

To further illustrate various illustrative embodiments of the present invention, the following examples are provided.

EXAMPLE 1

A sample of a fluid loss control additive complex was prepared by adding 33 grams of ERKOL 40/140 S polyvinyl alcohol and 33 g of sorbitol to 115 grams of 2-propanol. 14 grams of water were then added, and the resulting solution was stirred at 170° F. for 2 hours in a flask equipped with a reflux condenser. A 14.5 gram solution of saturated boric acid (containing 0.91 g of boric acid) was added. Subsequently, the pH of the solution was adjusted by slowly adding 7.3 grams of a 12.5 M NaOH solution. The mixture was allowed to react one hour and then the 2-propanol was removed by distillation. The residual water was removed in a vacuum oven. An emulsified fluid loss control additive was prepared by adding 4 grams of PEG 20 sorbitan trioleate and 16 grams of water into 42 grams of soy bean oil. 41 grams of the fluid loss control additive complex were then slowly added into the emulsion. The emulsion was vigorously mixed for 5 minutes with a mixer. The resulting emulsion was easily re-dispersable and stable for 48 hours minimum.

EXAMPLE 2

Three cement compositions (Samples 1-3) were prepared. Sample 1 was prepared by blending 100% Lafarge Class H cement, 42% water, and 0.7% polyvinyl alcohol, with all percentages being by weight of the cement.

Sample 2 was prepared by blending 100% Lafarge Class H cement, 42% water, and 0.7% sorbitol, with all percentages being by weight of the cement.

The emulsified fluid loss control additive of Example 1 was used as a fluid loss control additive for Sample 3. Sample 3 was prepared by blending 100% Lafarge Class H cement, 42% water, and 3.5% of the emulsified fluid loss control additive, with all percentages being by weight of the cement.

The Samples were blended according to the procedures set forth in the API Recommended Practice for Testing Well Cements 10B, 23$^{rd}$ edition, April 2002 (API 10B).

The thickening time for each Sample was determined with the results noted in Table I. Thickening time tests were performed according to the procedures in API 10B. Data from the standard API schedule was used to prepare a test schedule to simulate the anticipated well conditions. The thickening times were obtained at each sample 1-3 using an atmospheric consistometer of Chandler Engineering Company of Tulsa, Okla. at 170° F.

A fluid loss test was performed on each Sample at 170° F. in accordance with API 10B, with the results noted in Table I.

TABLE I

| Cement Composition Samples | Thickening Time | Fluid Loss at 170° F. |
|---|---|---|
| Sample 1 | 2.33 hours | 16 ml |
| Sample 2 | >7.5 hours | None |
| Sample 3 | 2.58 hours | 24 ml |

It is shown that polyvinyl alcohol alone as the fluid loss control additive did not affect the thickening time and that sorbitol alone as the fluid loss control additive retarded the cement composition to provide a thickening time of more than 7.5 hours, which did not control fluid loss. The thickening time of 2.58 hours shows that the polyvinyl alcohol and sorbitol were crosslinked, with the sorbitol unable to retard the cement composition.

EXAMPLE 3

Cement compositions (Samples 4-6) were prepared using the emulsified fluid loss control additive of Example 1. Sample 4 was prepared by blending 100% Class H cement, 42% water, and 0.70% of the fluid loss control additive of Example 1. Sample 5 was prepared by blending 100% Class H cement, 42% water, and 1.0% of the fluid loss control additive of Example 1. Sample 6 was prepared by blending 100% Class H cement, 42% water, and 0.17% of the fluid loss control additive of Example 1. All percentages of Samples 4-6 are by weight of the cement. Each of the cement compositions were prepared under conditions set forth in API 10B.

An API 10B fluid loss test was performed on Samples 4-6 with the results indicated in Table II.

TABLE II

| Sample Number | % Dosage of Emulsion by Weight of Cement | Rheology Readings | Fluid Loss |
|---|---|---|---|
| Sample 4 | 1.5% | 155-83-57-31-6-4 | 10 ml |
| Sample 5 | 1.0% | 185-102-71-41-20-8 | 20 ml |
| Sample 6 | 0.7% | 200-129-100-69-25-19 | 56 ml |

As developers of fluid loss control additives typically target an API 10B fluid loss of below about 100 ml, it can be seen that cement compositions having fluid loss control additives with cross linked polyvinyl alcohol and sorbitol provide a desirable level of fluid loss control.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A cement composition comprising cement, water, and a fluid loss control additive, wherein the fluid loss control additive comprises a polymer and a sugar connected by a pH-sensitive crosslink.

2. The cement composition of claim 1, wherein the cement composition has a density of from about 4 lb/gallon to about 23 lb/gallon.

3. The cement composition of claim 1, wherein the cement comprises a Portland cement, a pozzolana cement, a gypsum cement, a phosphate cement, a high alumina content cement, a silica cement, a high alkalinity cement, or combinations thereof.

4. The cement composition of claim 1, wherein the fluid loss control additive is present in the cement composition in an amount from about 0.01 to about 10.0 percent by weight of the cement.

5. The cement composition of claim 1, wherein the fluid loss control additive comprises a weight ratio of polymer to sugar of from about 1:3 to about 10:1.

6. The cement composition of claim 1, wherein the pH-sensitive crosslink is achieved through a polyvalent cation.

7. The cement composition of claim 6, wherein the polyvalent cation comprises a Group IIIA element or a Group IVB element.

8. The cement composition of claim 6, wherein the polyvalent cation comprises boron.

9. The cement composition of claim 6, wherein the fluid loss control additive contains the polyvalent cation in the amount of from about 0.001 to about 5 percent by weight of the polymer.

10. The cement composition of claim 1, wherein the pH-sensitive crosslink comprises a borate ester.

11. The cement composition of claim 1, wherein the fluid loss control additive is biodegradable.

12. The cement composition of claim 1, wherein the sugar is a sugar alcohol.

13. The cement composition of claim 12, wherein the sugar alcohol comprises sorbitol, maltitol, isomalt, xylitol, lactitol, hydrogenated starch hydrolysate, or combinations thereof.

14. The cement composition of claim 12, wherein the sugar alcohol comprises sorbitol.

15. The cement composition of claim 1, wherein the polymer comprises a polyalcohol, an alpha hydroxy acid, a 1,2 amine, or combinations thereof.

16. The cement composition of claim 1, wherein the polymer comprises polyvinyl alcohol.

17. The cement composition of claim 1, wherein the fluid loss control additive is an emulsion further comprising a carrier fluid.

18. The cement composition of claim 17, wherein the carrier fluid is a hydrophobic carrier fluid.

19. The cement composition of claim 17, wherein the fluid loss control additive comprises from about 1 to about 90 wt. % carrier fluid.

* * * * *